United States Patent [19]
Marks et al.

[11] Patent Number: 5,886,501
[45] Date of Patent: Mar. 23, 1999

[54] BATTERY PACK ELECTRICAL INTERCONNECTS

[75] Inventors: Richard William Marks, Grosse Pointe Woods; John D. Steele, Troy, both of Mich.

[73] Assignee: General Motors Corporation, Detroit, Mich.

[21] Appl. No.: 835,395

[22] Filed: Apr. 7, 1997

[51] Int. Cl.⁶ .................................. H02J 7/00; H01M 2/10
[52] U.S. Cl. ........................... 320/112; 320/107; 429/99; 429/149
[58] Field of Search ................................ 320/107, 112; 429/96, 97, 98, 99, 149

[56] References Cited

U.S. PATENT DOCUMENTS

| | | | |
|---|---|---|---|
| 2,395,652 | 2/1946 | Anderson | 429/99 |
| 2,812,378 | 11/1957 | Barrett | 429/99 |
| 3,635,766 | 1/1972 | Quisling | 429/99 |
| 4,957,829 | 9/1990 | Holl | 429/99 |
| 5,017,441 | 5/1991 | Lindner | 429/99 |
| 5,534,364 | 7/1996 | Watanabe et al. | 429/99 |
| 5,558,949 | 9/1996 | Iwatsuki et al. | 429/99 |
| 5,736,272 | 4/1998 | Vennstra et al. | 429/99 |

*Primary Examiner*—Peter S. Wong
*Assistant Examiner*—K. Shin
*Attorney, Agent, or Firm*—Lawrence B. Plant

[57] ABSTRACT

A battery pack including a cover overlying a plurality of individual batteries and a plurality of inter-battery connectors for electrically coupling the several batteries together. The inter-battery connectors are secured to the cover such that upon removal of the cover all of the connectors are removed from the batteries en masse.

4 Claims, 5 Drawing Sheets

BATTERY PACK ELECTRICAL INTERCONNECTS

TECHNICAL FIELD

This invention relates to battery packs (e.g., for electric vehicles), and more particularly to inter-battery electrical connectors therefor which are removable en masse from the several batteries forming the pack.

BACKGROUND OF THE INVENTION

A number of applications (e.g., electric vehicle or stationary power sources) require that a plurality of batteries be bundled together into a battery pack to provide a specified amount of electric power. Such batteries are typically arranged on an underlying support (e.g., in a tray), and held down on the support by means of a cover that overlies the batteries and is secured (e.g., by bolts) to the underlying support. The terminals of the several batteries are electrically connected to each other (i.e., in electrical series or parallel) by means of a plurality of inter-battery connectors. When the time comes to replace or repair one or more of the batteries in the pack it has heretofore been necessary to individually disconnect the inter-battery connectors from each terminal of the batteries needing replacement/repair. Moreover, the other batteries remain electrically coupled with a high voltage output capability.

SUMMARY OF THE INVENTION

The present invention simplifies assembly and disassembly of a battery pack for repair or replacement and eliminates high voltages from the work area. The present invention contemplates the en masse disconnecting of the inter-battery connectors from the several batteries in the pack when the cover is removed from the battery pack and reconnecting of the batteries when the cover is replaced. As a result, defective batteries are readily replaceable or repairable without having to individually disconnect the connectors thereto, and the remaining batteries (i.e., which do not need repair/replacement) are electrically disconnected from each other so as to provide a low voltage working environment. More specifically, the present invention comprehends a battery pack including a plurality of batteries bundled together, each having first and second opposite polarity terminals. A plurality of inter-battery connectors electrically couple one battery to the next, and are so secured to a cover overlying the pack that removal of the cover disconnects the several connectors en masse from their associated-battery terminals. The inter-battery connectors each have a first coupler at one end thereof slideably, but snugly, engaging a terminal on one of the batteries and a second coupler on another end thereof slideably, but snugly, engaging a terminal on another of the batteries. Preferably, each coupler will constrictively engage a terminal stud on the battery to which it is coupled. The cover includes a plurality of retainers which engage and secure the inter-battery connectors to the cover with sufficient strength that all of the connectors will disengage from their respective battery terminals when the cover is removed from the pack. Preferably, the cover detachably secures the connectors thereto such that the connectors can be readily removed from the cover as needed. Most preferably, the batteries will be supported on an underlying support, and the cover secures (e.g., as by bolting) the pack to the support. The inter-battery connectors preferably comprise a rigid strap, and the cover has a plurality of protuberances extending from its underside to engage and secure the strap to the cover. Most preferably, the protuberances each include a lip which underlies an edge of the inter-battery connector strap to secure the strap to the underside of the cover.

DESCRIPTION OF THE PREFERRED EMBODIMENT

The invention will better be understood when considered in the light of the following detailed description of a preferred embodiment thereof which is given hereafter in conjunction with the several figures in which:

Figure 7:
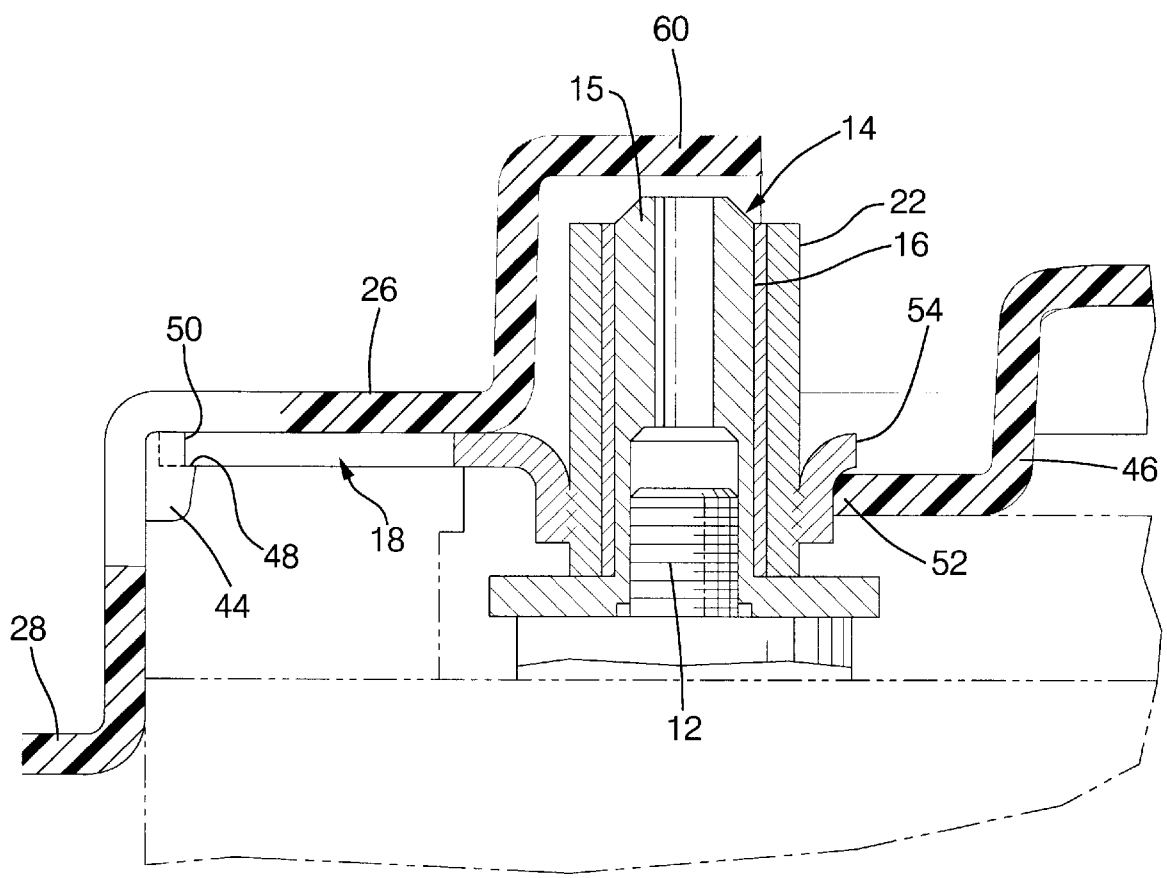
FIG. 7 is a view in the direction 7—7 of FIG. 2.

The Figures depict a battery pack 2 comprising a plurality of individual batteries 4 supported in an underlying support/tray 6. Each battery 4 has a pair of opposite polarity terminals 8 and 10. In the particular embodiment shown, the terminals 8, 10 comprise upstanding threaded bolts 12 (see FIG. 7), though other configurations are possible. An adaptor 14, having a smooth cylindrical outer surface 16, is screwed on to the bolt 12 to provide an upstanding stud 15 for connecting to an inter-battery connector 18. Alternatively, the adaptor 14 could be eliminated and the bolt 12 replaced by a smooth-sided stud. The inter-battery connector 18 preferably comprises a rigid strap 20 having a coupler 22 and 24 on each end thereof for constrictively engaging the adaptor 14. The strap 20 preferably has apertures 56 and 58 therein for receiving the couplers 22 and 24 which are brazed or crimped therein, as best shown in FIG. 7. A cover 26 overlies the several batteries 4 and includes flanges 28 that receive bolts 30 extending from mountings 32 in the tray 6 for anchoring the cover 26 to the tray 6 to thereby secure (i.e., hold down) the several batteries 4 in the tray 6. The tray 6 includes laterally extending mounting flanges 28 and 30 for mounting the battery pack where needed (e.g., to the frame of an electric vehicle).

Figure 1:
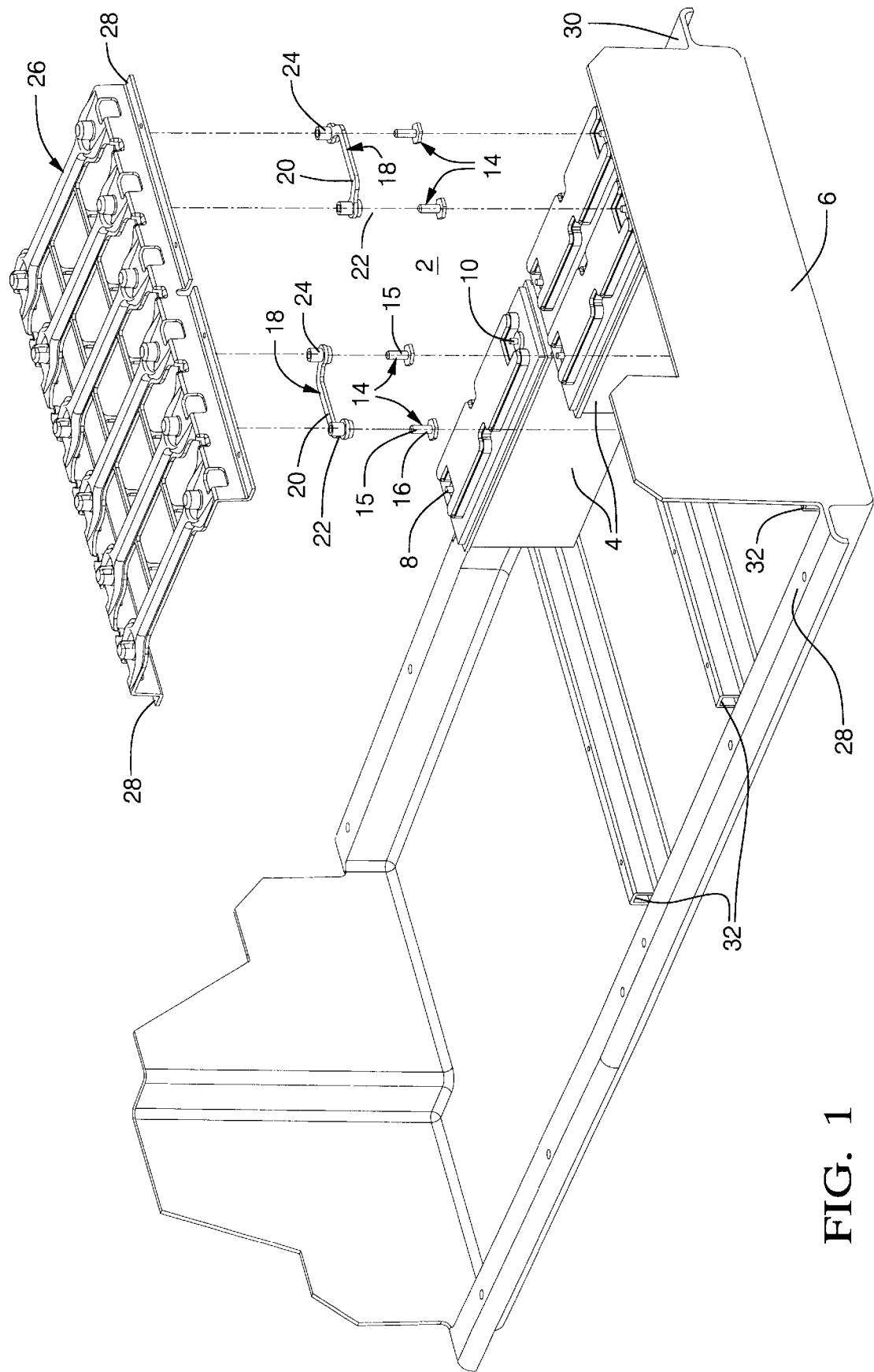
FIG. 1 is an exploded isometric view of part of a battery pack in accordance with the present invention.
Figure 2:
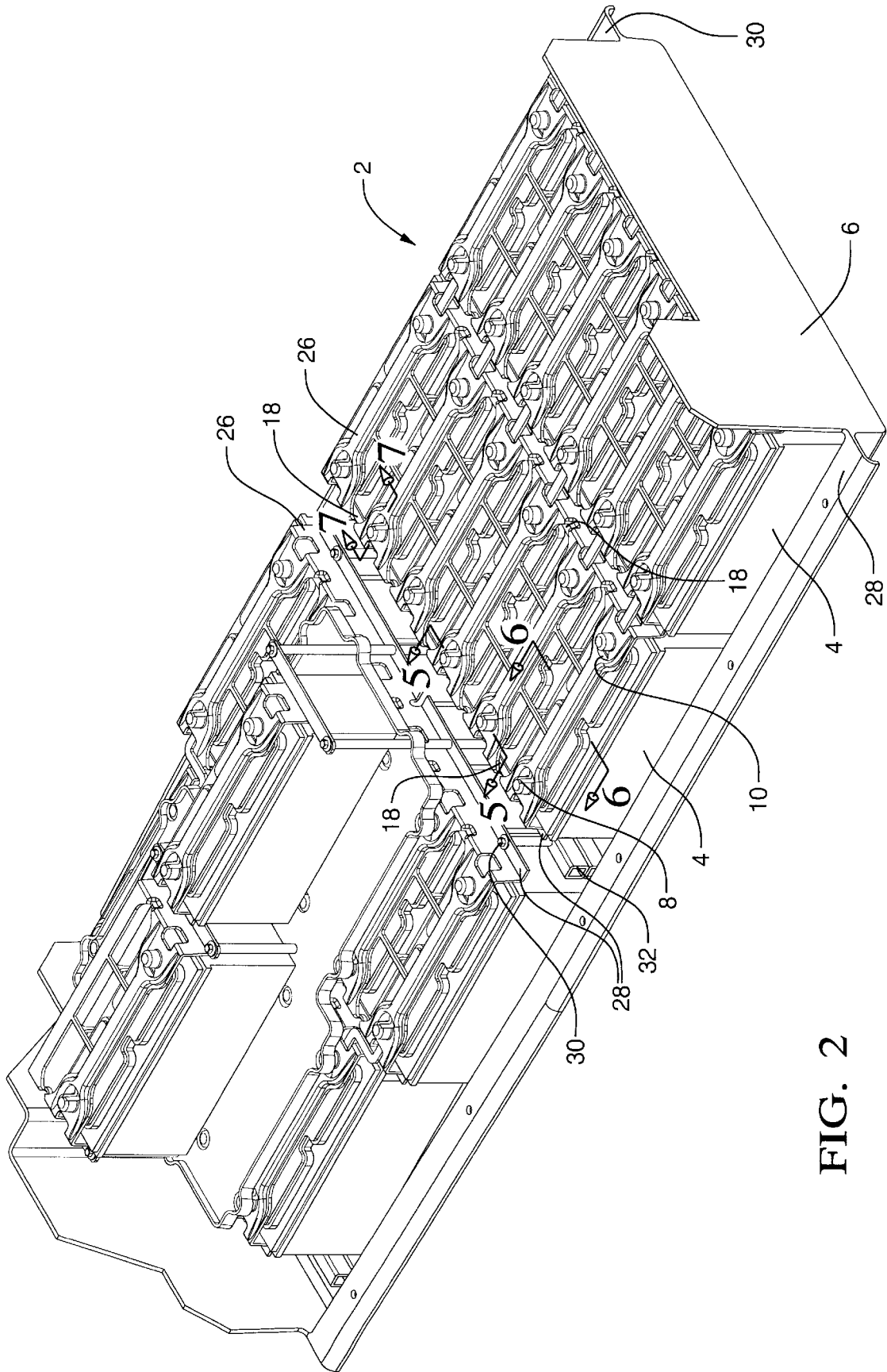
FIG. 2 is a fully assembled isometric view of the battery pack of FIG. 1.
Figures 3, 4:
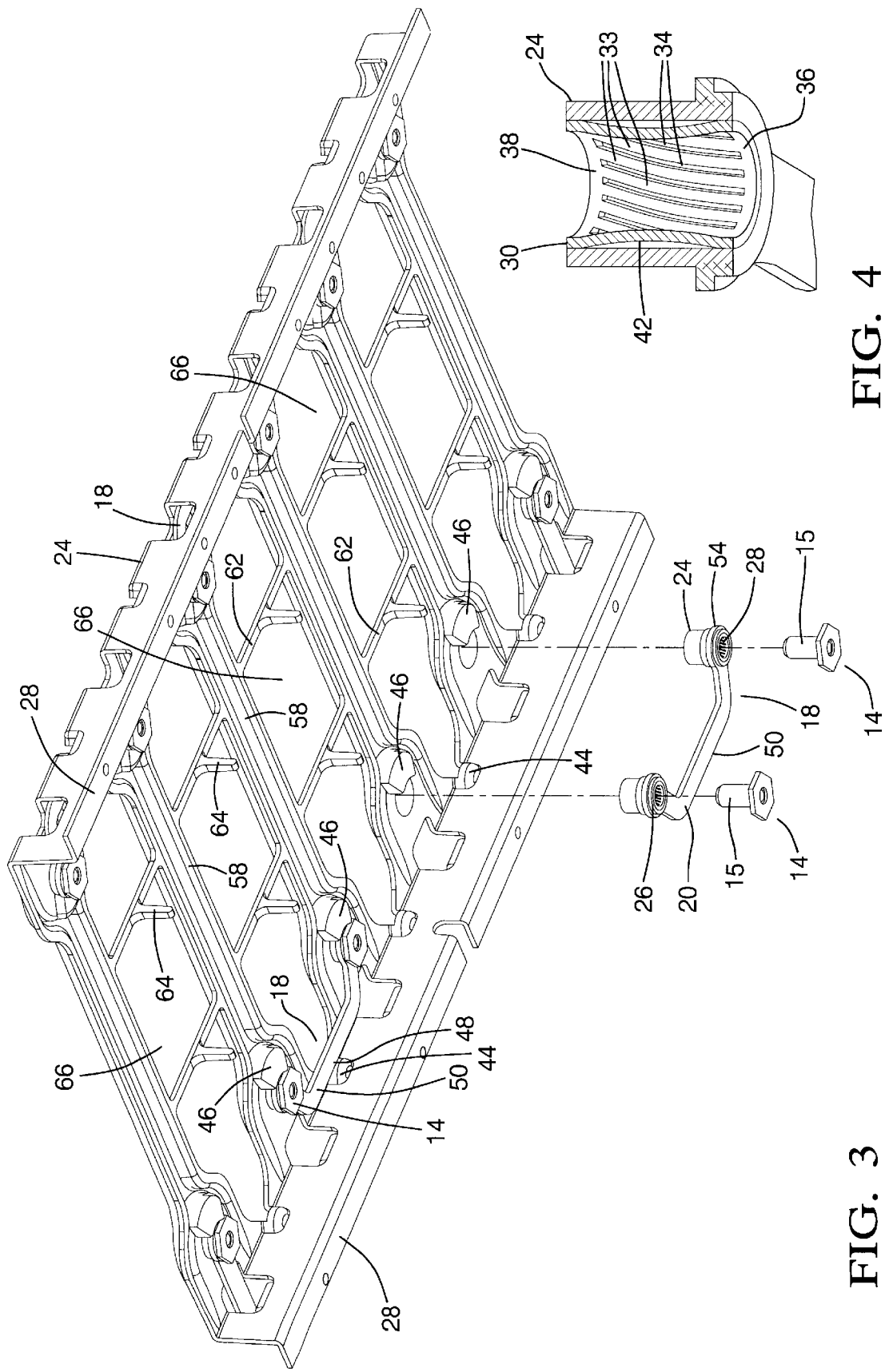
FIG. 3 is an isometric view of the underside of the battery cover of FIGS. 1 and 2 in accordance with the present invention.
FIG. 4 is a sectioned isometric view of a coupler on the end of an inter-battery connector.
Figure 5:
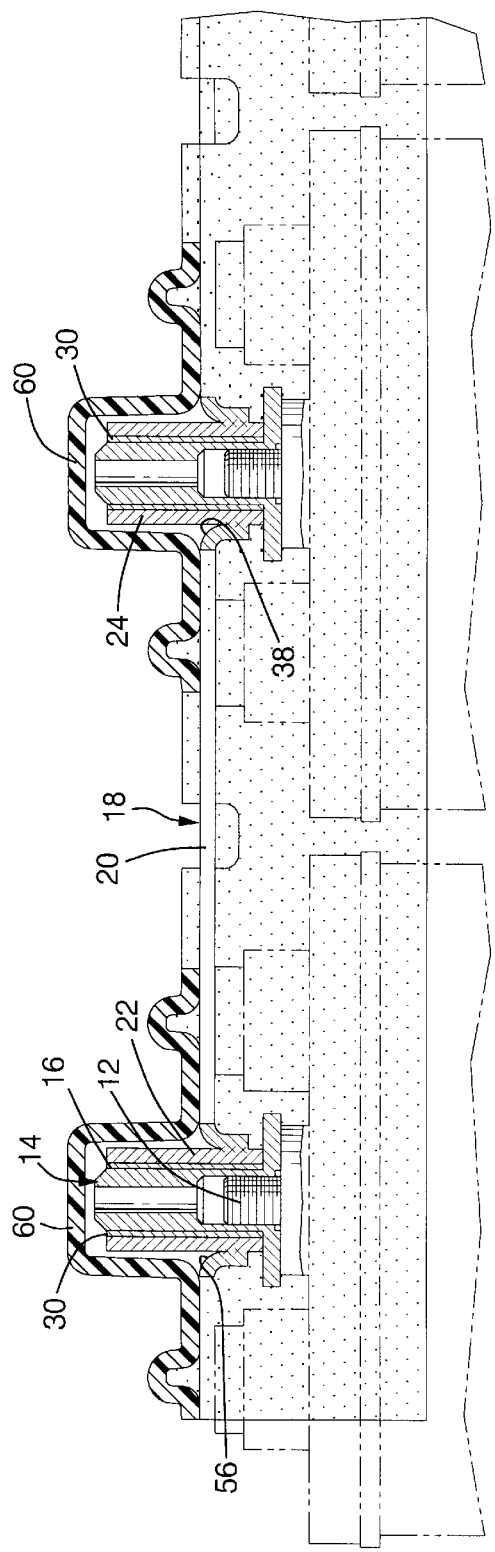
FIG. 5 is a view in the direction 5—5 of FIG. 2.

The rigid strap 20 forms the inter-battery electrical connector 18 and has a pair of couplers 22 and 24, in the form of sleeves thereon adapted to slip over, and mate with, the studs 15. The coupler sleeves 22 and 24 slideably fit snugly over the studs 15 to provide good electrical contact therewith while, at the same time, being readily removable therefrom by applying a modest upward force thereto. To this end, the insides 26 and 28 of the couplers 22 and 24 are lined with commercially available hyperbolic or helical terminals, and preferably with hyperbolic/helical terminals sold by the RADSOC Company. Hyperbolic/helical liners 30 provide excellent electrical contact yet readily slip on and off their associated terminals. Such liners 30 preferably comprise a plurality of wires 33 separated by slots 34 which are joined together at their ends 36 and 38, as best shown in FIG. 4. The several wires 33 are preferably skewed relative to the center axis of the liner 30 so as to provide a helix. This is conveniently accomplished by twisting the liner 30 which also causes its longitudinal center to become necked down at the reduced diameter zone 42 such that the liner takes on a hyperbolic shape. Such liners are capable of expanding radially to snugly and constrictively engage the studs 15 without requiring excessive force to attach or remove them from their associated studs. The necked down portion 42 of the liner 30 is smaller than the outside diameter of the stud 15, but is readily expansible when the stud 15 is inserted therein. Once expanded, the liner will constrictively engage the smooth outer surface 16 of the stud 15 over substantially the entire length thereof hence resulting in a low resistance electrical connection therebetween. Preferably, the wires 33 that make up the liner 30 are flat so that a large surface area thereof will engage the adaptor stud 15 for excellent low-resistance contact therebetween.

In accordance with the present invention, the inter-battery connector straps 20 are secured to the cover 26 with sufficient strength that upon lifting the cover 26 from atop the battery pack 2, the couplers 22 and 24 will become disengaged from the studs 15 without disengaging the connector strap 20 from the cover 26. To this end, the cover 26 includes a plurality of retainers, in the form of protuberances 44 and 46, which engage the strap 20 and hold it to the underside of the cover 26. The protuberances 44 each include a shelf 48 which underlies the edge 50 of the strap 20. Similarly, the protuberances 46 each include a shelf 52 underlying the edge 54 of the strap 20 (as best shown in FIG. 7). To properly locate the straps 20 on the cover 26 so as to insure that their couplers 22 and 24 are properly registered with their mating studs 15, the straps 20 are first positioned on the batteries 4. Thereafter, the cover 26 is pressed on to the top of the battery pack 2 so as to cause the inter-battery connector straps 20 to snap into place of the shelves 48 and 52 of the protuberances 44 and 46 respectively. Thereafter, when the cover 26 is lifted from the batteries 4, the straps 20 will remain with the cover 26 and all of the batteries are electrically disconnected from each other, en masse. The straps 20, however, may be readily removed from the cover 26 by prying or pulling them away from the shelves 48 and 52 that engage them. Other techniques (e.g., bolts) may be-used to secure the inter-battery connector straps 20 to the cover 26 in a manner such that the straps 20 may be detached from the cover 26 when so desired.

Figure 6:
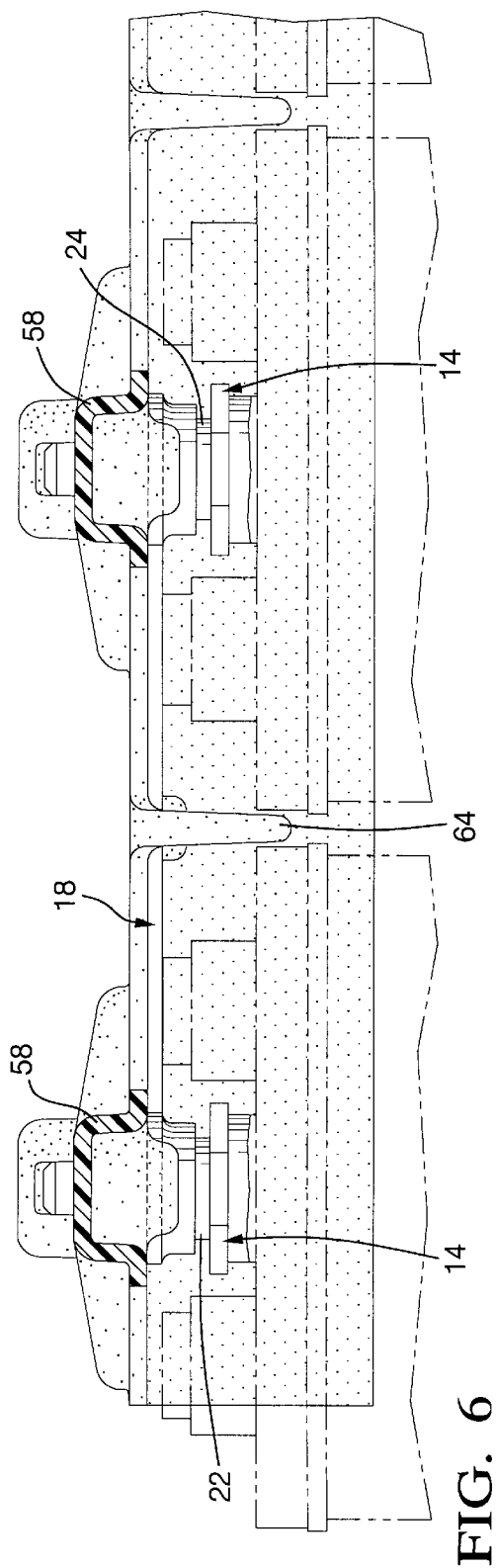
FIG. 6 is a view in the direction 6—6 of FIG. 2.

The cover 26 will preferably comprise a lightweight, grate-like, structure molded (e.g., vacuum formed) from a glass-fiber-filled plastic such as polypropylene, although other materials and methods of construction may also be employed. The cover 26 includes inverted U-shaped rails 58 extending from one side thereof to the other which provides strength without excessive weight. The cover 26 includes sockets 60 which loosely receive the couplers 22 and 24 therein, and substantially insulate them from inadvertent electrical shorting. Some clearance is provided between the outside of the couplers 22 and 24 and the inside of the sockets 60 to allow room for longitudinal movement of the strap 20 therein as may be needed to properly register the couplers 22 and 24 with respect to their associated studs 15 during placement of the cover 26 atop the batteries 4. Cross members 62 extend between the rails 58, and include depending tapered legs 64 which are adapted to fit between the several batteries 4 in the stack (see FIG. 6), and serve to align the cover 26 with the batteries 4 during placement of the cover 26. Openings 66 in the cover 26 between the rails 58 and cross members 62 permit air to circulate between the batteries 4 for cooling and/or heating, as may be necessary.

While the invention has been disclosed primarily in terms of specific embodiments thereof it is not intended to be limited thereto but rather only to the extent set forth hereafter in the claims which follow.

We claim:

1. In a battery pack comprising a plurality of batteries bundled together, first and second polarity terminals on each of said batteries, a plurality of inter-battery connectors electrically coupling a said terminal of one said battery to a said terminal of another said battery in said pack, and a cover overlying said batteries, the improvement wherein said connectors each comprise a rigid strap having a first electrically conductive coupler at one end thereof adapted to slideably constrictively engage a said terminal on one of said batteries and a second electrically conductive coupler on another end thereof to slideably constrictively engage a terminal on another of said batteries, and said cover has an underside confronting said batteries including a plurality of protuberances extending from said underside so as to engage said strap and secure it to said cover with sufficient strength to permit en masse disengagement of said connectors from said terminals by said cover when said cover is removed from said pack without disengaging said connectors from said cover.

2. The battery pack according to claim 1 wherein said protuberances each include a lip underlying an edge of said strap.

3. In a battery pack comprising a plurality of batteries bundled together, first and second opposite polarity terminals on each of said batteries, a plurality of inter-battery connectors electrically coupling a said terminal of one said battery to a said terminal of another said battery in said pack, and a cover overlying said batteries, the improvement wherein said connectors each have a first electrically conductive coupler at one end thereof adapted to snugly, slideably constrictively engage a said terminal on one of said batteries and a second electrically conductive coupler on another end thereof to snugly, slideably constrictively engage a said terminal on another of said batteries, and a plurality of retainers on the underside of said cover detachably securing said connectors to said cover with sufficient strength to permit en masse disengagement of said connectors from said terminals by said cover when said cover is removed from said pack without disengaging said connectors from said cover.

4. In a battery pack comprising a plurality of batteries carried on an underlying support, first and second polarity terminals on each of said batteries, a plurality of inter-battery connectors electrically coupling a said terminal of one said battery to a said terminal of another said battery in said pack, and a cover overlying said batteries and securing said batteries to said support, the improvement wherein said connectors each have a first electrically conductive coupler at one end thereof adapted to slideably constrictively engage a said terminal on one of said batteries and a second electrically conductive coupler on another end thereof to slideably constrictively engage a said terminal on another of said batteries, and a plurality of retainers on the underside of said cover detachably securing said connectors to said cover with sufficient strength to permit en masse disengagement of said connectors from said terminals by said cover when said cover is removed from said pack without disengaging said connectors from said cover.

* * * * *